(12) United States Patent
Hirato

(10) Patent No.: US 11,155,106 B2
(45) Date of Patent: Oct. 26, 2021

(54) IMAGE FORMING APPARATUS

(71) Applicant: FUJIFILM Corporation, Tokyo (JP)

(72) Inventor: Katsuyuki Hirato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 16/857,189

(22) Filed: Apr. 24, 2020

(65) Prior Publication Data

US 2020/0247148 A1    Aug. 6, 2020

Related U.S. Application Data

(63) Continuation of application No. PCT/JP2018/041342, filed on Nov. 7, 2018.

(30) Foreign Application Priority Data

Dec. 13, 2017  (JP) .............................. JP2017-238727

(51) Int. Cl.
*B41J 11/00* (2006.01)
*B65H 29/54* (2006.01)

(52) U.S. Cl.
CPC .......... *B41J 11/007* (2013.01); *B41J 11/0085* (2013.01); *B65H 29/54* (2013.01)

(58) Field of Classification Search
CPC ..... B41J 11/007; B41J 11/0085; B65G 47/52; B65H 5/02; B65H 2/22
See application file for complete search history.

(56) References Cited

U.S. PATENT DOCUMENTS

2008/0296129 A1   12/2008  Yagi et al.
2011/0050825 A1   3/2011   Murata et al.

FOREIGN PATENT DOCUMENTS

| JP | S601703220 | 11/1985 |
| JP | H01187143 | 7/1989 |
| JP | 07314818 A * | 12/1995 |
| JP | 3305871 B2 * | 7/2002 |

(Continued)

OTHER PUBLICATIONS

"International Search Report (Form PCT/ISA/210) "of PCT/JP2018/041342, dated Jan. 22, 2019, with English translation thereof, pp. 1-5.

(Continued)

*Primary Examiner* — Sharon Polk
(74) *Attorney, Agent, or Firm* — JCIPRNET

(57) ABSTRACT

Provided is an image forming apparatus in which paper is stably transferred from a belt transportation unit on an upstream side to a belt transportation unit on a downstream side. Problems as described above are solved by using the image forming apparatus including a first belt transportation unit, a second belt transportation unit, and a third belt transportation unit that transports a recording medium received from the first belt transportation unit to transfer the recording medium to the second belt transportation unit, in which a diameter of an upstream side pulley of the third belt transportation unit is smaller than a diameter of a downstream side pulley of the first belt transportation unit and a diameter of a downstream side pulley of the third belt transportation unit is smaller than a diameter of an upstream side pulley of the second belt transportation unit.

20 Claims, 8 Drawing Sheets

(56) References Cited

FOREIGN PATENT DOCUMENTS

| | | |
|---|---|---|
| JP | 2008222418 | 9/2008 |
| JP | 2008297122 | 12/2008 |
| JP | 2011051165 | 3/2011 |
| JP | 2015047702 | 3/2015 |
| JP | 2019167230 A * | 10/2019 |

OTHER PUBLICATIONS

"Written Opinion of the International Searching Authority (Form PCT/ISA/237)" of PCT/JP2018/041342, dated Jan. 22, 2019, with English translation thereof, pp. 1-12.

"Office Action of Japan Counterpart Application" with English translation thereof, dated May 7, 2021, p. 1-p. 7.

* cited by examiner

IMAGE FORMING APPARATUS

CROSS-REFERENCE TO RELATED APPLICATIONS

This application is a Continuation of PCT International Application No. PCT/JP2018/041342 filed on Nov. 7, 2018, which claims priority under 35 U.S.C § 119(a) to Japanese Patent Application No. 2017-238727 filed on Dec. 13, 2017. Each of the above application(s) is hereby expressly incorporated by reference, in its entirety, into the present application.

BACKGROUND OF THE INVENTION

1. Field of the Invention

The present invention relates to an image forming apparatus, particularly relates to a technique of transporting a recording medium by means of a transportation belt.

2. Description of the Related Art

In an image forming apparatus, paper, which is a recording medium, is placed on a transportation belt of a belt transportation unit and transported. In addition, there is known an image forming apparatus that comprises a plurality of belt transportation units and in which paper is transferred from a belt transportation unit on an upstream side to a belt transportation unit on a downstream side in a transportation direction. In such an image forming apparatus, it is desired that the paper is stably transferred between the belt transportation units.

JP2015-047702A discloses an image forming apparatus including a first transportation mechanism that causes paper to be adsorbed onto a first transportation belt and transports the paper and a second transportation mechanism that causes the paper transported from the first transportation mechanism to be adsorbed onto a second transportation belt and transports the paper, the image forming apparatus being configured such that, in a case where the paper is laid across the first transportation belt and the second transportation belt, an adsorption force of the laid paper with respect to the first transportation belt becomes larger than an adsorption force with respect to the second transportation belt. The first transportation mechanism and the second transportation mechanism correspond to belt transportation units.

According to JP2015-047702A, paper can be stably transferred between belt transportation units.

SUMMARY OF THE INVENTION

As image forming apparatuses are enhanced in speed and image quality, the number of cases where a robust transportation belt formed of stainless steel or the like is used as a transportation belt has been increased. In a case where a robust transportation belt is used, it is necessary to increase the diameter of a pulley on which the transportation belt is wound.

However, in a case where the diameter of the pulley is increased, there is a problem that an interval between a region in a belt transportation unit on an upstream side in which stable transportation can be performed and a region in a belt transportation unit on a downstream side in which stable transportation can be performed is enlarged and rise or the like of paper becomes likely to occur in a case where relatively small paper is transferred and in a case where relatively thin paper or the like is transferred.

The present invention has been made in consideration of such circumstances and an object thereof is to provide an image forming apparatus in which a recording medium is stably transferred between belt transportation units.

In order to achieve the above-described object, an image forming apparatus according to an aspect of the present invention is an image forming apparatus comprising a first belt transportation unit that transports a recording medium, a second belt transportation unit that transports the recording medium, a third belt transportation unit that transports the recording medium received from the first belt transportation unit to transfer the recording medium to the second belt transportation unit, and an image forming unit that forms an image on a recording surface of the recording medium, in which the first belt transportation unit has a first upstream side pulley, a first downstream side pulley, a first belt that is looped over the first upstream side pulley and the first downstream side pulley, and a first drive unit that causes the first belt to travel and the first belt transportation unit transports the recording medium along a first transportation route from the first upstream side pulley to the first downstream side pulley with the recording medium abutting onto the first belt, the second belt transportation unit has a second upstream side pulley, a second downstream side pulley, a second belt that is looped over the second upstream side pulley and the second downstream side pulley, and a second drive unit that causes the second belt to travel and the second belt transportation unit transports the recording medium along a second transportation route from the second upstream side pulley to the second downstream side pulley with the recording medium abutting onto the second belt, the third belt transportation unit has a third upstream side pulley, a third downstream side pulley, a third belt that is looped over the third upstream side pulley and the third downstream side pulley, and a third drive unit that causes the third belt to travel and the third belt transportation unit transports the recording medium along a third transportation route from the third upstream side pulley to the third downstream side pulley with the recording medium abutting onto the third belt, and a diameter of the third upstream side pulley is smaller than a diameter of the first downstream side pulley and a diameter of the third downstream side pulley is smaller than a diameter of the second upstream side pulley.

According to the aspect, since the diameter of the third upstream side pulley of the third belt transportation unit is smaller than the diameter of the first downstream side pulley of a first belt transportation unit and the diameter of the third downstream side pulley of the third belt transportation unit is smaller than the diameter of the second upstream side pulley of the second belt transportation unit in the third belt transportation unit that transports the recording medium received from the first belt transportation unit to transfer the recording medium to the second belt transportation unit, the recording medium can be stably transferred from the first belt transportation unit on an upstream side to the second belt transportation unit on a downstream side.

In a case where the diameter of the first downstream side pulley is $D_1$, the diameter of the second upstream side pulley is $D_2$, the diameter of the third upstream side pulley is $D_{3U}$, and the diameter of the third downstream side pulley is $D_{3D}$, it is preferable that at least one of $D_1/D_{3U} \geq 2$ or $D_2/D_{3D} \geq 2$ is satisfied. In this case, the recording medium can be stably transferred from the first belt transportation unit on the upstream side to the second belt transportation unit on the downstream side.

It is preferable that at least one of the first belt, the second belt, or the third belt is formed of metal. In this case, an improvement in durability can be achieved.

It is preferable that the third belt is formed of resin. In this case, the diameter of the third upstream side pulley can be made smaller than the diameter of the first downstream side pulley and the diameter of the third upstream side pulley can be made smaller than the diameter of the second upstream side pulley.

It is preferable that the first belt and the second belt are formed of metal. In this case, an improvement in durability can be achieved.

It is preferable that the first belt is provided with a plurality of first adsorption holes and the first belt transportation unit comprises a first negative pressure generating unit that generates a negative pressure in the plurality of first adsorption holes. In this case, the recording medium can be appropriately transported in the first belt transportation unit.

It is preferable that the second belt is provided with a plurality of second adsorption holes and the second belt transportation unit comprises a second negative pressure generating unit that generates a negative pressure in the plurality of second adsorption holes. In this case, the recording medium can be appropriately transported in the second belt transportation unit.

It is preferable that the third belt is provided with a plurality of third adsorption holes and the third belt transportation unit comprises a third negative pressure generating unit that generates a negative pressure in the plurality of third adsorption holes. In this case, the recording medium can be appropriately transported in the third belt transportation unit.

It is preferable that the third belt transportation unit comprises a first blower unit that blows a gas toward the recording surface of the recording medium in the third transportation route. In this case, the recording medium can be prevented from rising and the recording medium can be appropriately transported in the third belt transportation unit.

It is preferable that the first belt transportation unit comprises a peeling mechanism that peels off the recording medium from the first belt. In this case, the recording medium can be appropriately transferred to the third belt transportation unit.

It is preferable that the peeling mechanism comprises a plate-shaped member abutting onto the recording medium. In this case, the recording medium can be appropriately peeled off.

It is preferable that the peeling mechanism comprises a second blower unit that blows a gas to a space between the first belt and a leading end of the recording medium. In this case, the recording medium can be appropriately peeled off.

It is preferable that the peeling mechanism comprises a third blower unit that blows a gas to an outside of the first downstream side pulley from an inside of the first downstream side pulley. In this case, the recording medium can be appropriately peeled off.

It is preferable that the first drive unit, the second drive unit, and the third drive unit respectively cause the first belt, the second belt, and the third belt to travel in synchronization with each other. In this case, the recording medium can be appropriately transferred from the first belt transportation unit to the third belt transportation unit and from the third belt transportation unit to the second belt transportation unit.

It is preferable that the first drive unit, the second drive unit, and the third drive unit respectively cause the first belt, the second belt, and the third belt to travel at the same speed. In this case, the recording medium can be appropriately transferred from the first belt transportation unit to the third belt transportation unit and from the third belt transportation unit to the second belt transportation unit.

It is preferable that the third belt transportation unit comprises a driving pulley, the third belt is looped over the third upstream side pulley, the third downstream side pulley, and the driving pulley, and the third drive unit rotates the driving pulley. In this case, the third belt can be caused to travel appropriately even in a case where the diameters of the third upstream side pulley and the third downstream side pulley are made relatively small.

It is preferable that the first belt in the first transportation route, the second belt in the second transportation route, and the third belt in the third transportation route are disposed on the same plane. In this case, the recording medium can be appropriately transferred.

It is preferable that the first downstream side pulley and the third upstream side pulley are disposed to partially overlap each other as seen in plan view of the same plane. In this case, the recording medium can be appropriately transferred.

It is preferable that the third downstream side pulley and the second upstream side pulley are disposed to partially overlap each other as seen in plan view of the same plane. In this case, the recording medium can be appropriately transferred.

It is preferable that the image forming unit is disposed to face at least one of the first transportation route or the second transportation route. In this case, an image can be formed on the recording surface of the recording medium in at least one of the first belt transportation unit or the second belt transportation unit.

According to the present invention, a recording medium can be stably transferred between belt transportation units.

DESCRIPTION OF THE PREFERRED EMBODIMENTS

Hereinafter, preferable embodiments of the present invention will be described in detail with reference to the attached drawings.

First Embodiment

Figure 1:
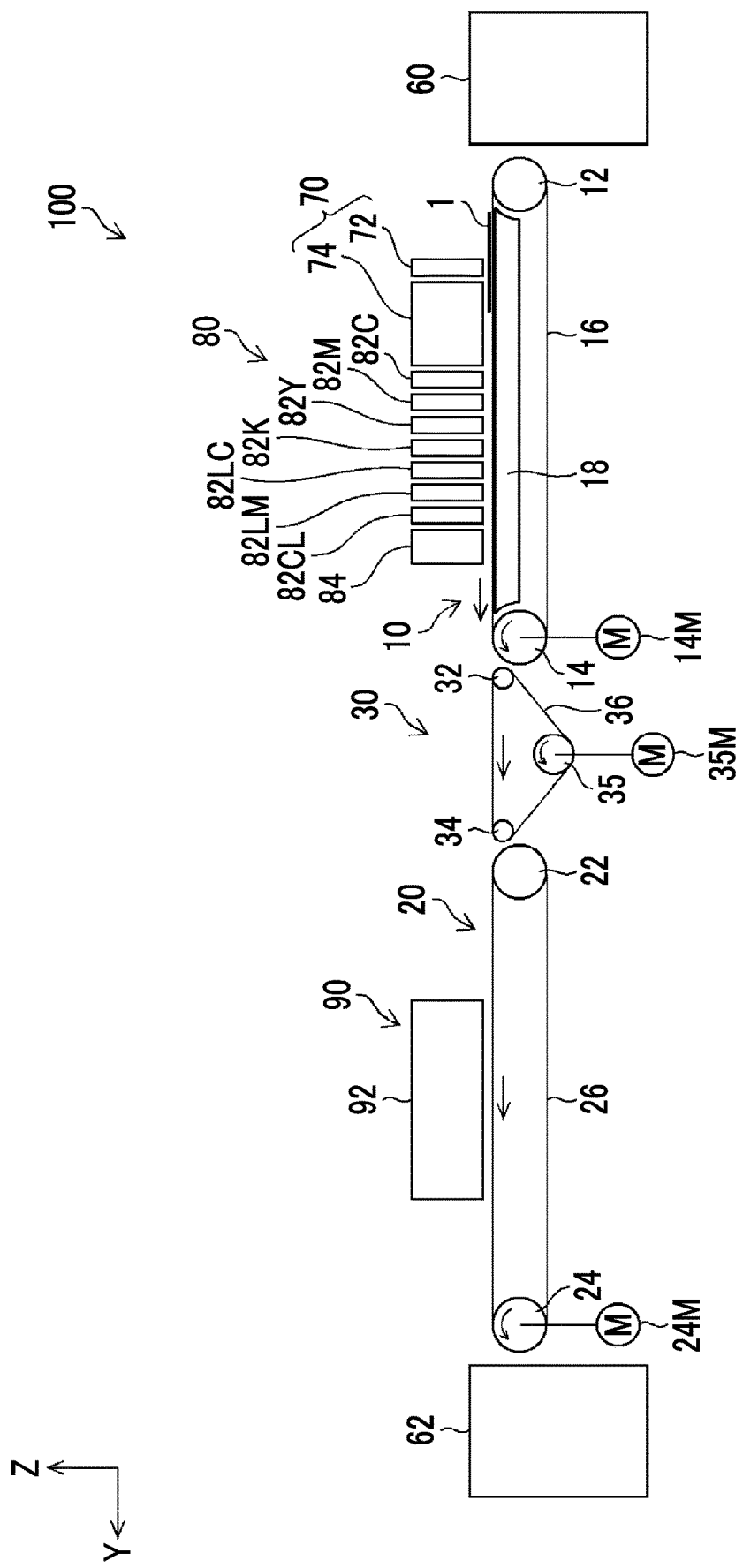
FIG. 1 is an entire configuration view of an ink jet printing apparatus.

FIG. 1 is an entire configuration view of an ink jet printing apparatus according to the present embodiment. An ink jet printing apparatus 100 (example of image forming apparatus) is an apparatus that performs printing on a sheet of paper 1, which is a recording medium, to generate a printed matter. As shown in FIG. 1, the ink jet printing apparatus 100 comprises a first belt transportation unit 10, a second belt transportation unit 20, a third belt transportation unit 30, a pretreatment liquid applying unit 70, an image forming unit 80, an ink drying unit 90, and the like.

[First Belt Transportation Unit]

The first belt transportation unit 10 transports the paper 1 in a transportation direction (direction Y) with a recording surface thereof facing a direction Z. The first belt transportation unit 10 comprises a first upstream side pulley 12, a first downstream side pulley 14, a first belt 16, and an adsorption unit 18.

The first upstream side pulley 12 has a rotary shaft (not shown) that extends in a horizontal direction and the rotary shaft is pivotally supported such that the rotary shaft can rotate. The first downstream side pulley 14 has a rotary shaft (not shown) that is parallel to the rotary shaft of the first upstream side pulley 12 and the rotary shaft is pivotally supported such that the rotary shaft can rotate. Here, a first distance between the rotary shaft of the first upstream side pulley 12 and the rotary shaft of the first downstream side pulley 14 is 3 m.

The first belt 16 is an endless belt formed of stainless steel (example of metal). The first belt 16 is looped over the first upstream side pulley 12 and the first downstream side pulley 14. Since the first belt 16 formed of stainless steel is used, it is possible to maintain the flatness of the paper 1 favorably. Note that, since the first belt 16 is formed of stainless steel, pulleys having relatively large diameters are used as the first upstream side pulley 12 and the first downstream side pulley 14. Here, the first upstream side pulley 12 and the first downstream side pulley 14 are equal to each other in diameter.

The first downstream side pulley 14 has a motor 14M (example of first drive unit) as driving means. In a case where the motor 14M is driven, the first downstream side pulley 14 rotates counterclockwise in FIG. 1. The first upstream side pulley 12 rotates counterclockwise in FIG. 1 following the rotation of the first downstream side pulley 14. In a case where the first upstream side pulley 12 and the first downstream side pulley 14 rotate, the first belt 16 travels along a traveling route between the first upstream side pulley 12 and the first downstream side pulley 14.

On a transportation surface of the first belt 16, the paper 1 supplied from a paper feeding unit 60 is placed (example of contact). The first belt transportation unit 10 transports the paper 1 placed on the first belt 16 along a transportation route (example of first transportation route) from the first upstream side pulley 12 to the first downstream side pulley 14 and transfers the paper 1 to the third belt transportation unit 30. In the transportation route from an upper end of the first upstream side pulley 12 to an upper end of the first downstream side pulley 14, the transportation surface of the first belt 16 forms a flat plane.

The adsorption unit 18 comprises a chamber (not shown) (example of first negative pressure generating unit) that supports the first belt 16 by means of a flat surface from a side opposite to the transportation surface and an exhaust pump (not shown) that discharges air from the inside of the chamber. In addition, the first belt 16 is provided with a plurality of first adsorption holes (not shown). The adsorption unit 18 sucks the first adsorption holes of the first belt 16 with the exhaust pump discharging air from the inside of the chamber such that the paper 1 placed on the transportation surface of the first belt 16 is adsorbed and held at the transportation surface. The adsorption unit 18 is disposed such that the paper 1 can be adsorbed and held over an area from a position that is to the right of a left end of the first upstream side pulley 12 to a position that is to the left of a right end of the first downstream side pulley 14 in FIG. 1.

[Second Belt Transportation Unit]

The second belt transportation unit 20 transports the paper 1 in the transportation direction (direction Y) with the recording surface thereof facing the direction Z. The second belt transportation unit 20 comprises a second upstream side pulley 22, a second downstream side pulley 24, and a second belt 26.

The second upstream side pulley 22 has a rotary shaft (not shown) that extends in a horizontal direction and the rotary shaft is pivotally supported such that the rotary shaft can rotate. The second downstream side pulley 24 has a rotary shaft (not shown) that is parallel to the rotary shaft of the second upstream side pulley 22 and the rotary shaft is pivotally supported such that the rotary shaft can rotate. Here, a second distance between the rotary shaft of the second upstream side pulley 22 and the rotary shaft of the second downstream side pulley 24 is 3 m.

The second belt 26 is an endless belt formed of stainless steel. The second belt 26 is looped over the second upstream side pulley 22 and the second downstream side pulley 24. Since the second belt 26 formed of stainless steel is used, it is possible to maintain the flatness of the paper 1 favorably. Note that, since the second belt 26 is formed of stainless steel, pulleys having relatively large diameters are used as the second upstream side pulley 22 and the second downstream side pulley 24. Here, the second upstream side pulley 22 and the second downstream side pulley 24 are equal to each other in diameter.

The second downstream side pulley 24 has a motor 24M (example of second drive unit) as driving means. In a case where the motor 24M is driven, the second downstream side pulley 24 rotates counterclockwise in FIG. 1. The second upstream side pulley 22 rotates counterclockwise in FIG. 1 following the rotation of the second downstream side pulley 24. In a case where the second upstream side pulley 22 and the second downstream side pulley 24 rotate, the second belt 26 travels along a traveling route between the second upstream side pulley 22 and the second downstream side pulley 24.

On a transportation surface of the second belt 26, the paper 1 transferred from the third belt transportation unit 30 is placed. The second belt transportation unit 20 transports the paper 1 placed on the second belt 26 along a transportation route (example of second transportation route) from the second upstream side pulley 22 to the second downstream side pulley 24 and discharges the paper 1 to a paper discharge unit 62. In the transportation route from an upper end of the second upstream side pulley 22 to an upper end of the second downstream side pulley 24, the transportation surface of the second belt 26 forms a flat plane.

Note that, the second belt transportation unit 20 may be provided with an adsorption unit (example of second negative pressure generating unit) such that the paper 1 is adsorbed at the transportation surface of the second belt 26. The adsorption unit may have the same configuration as the adsorption unit 18 of the first belt transportation unit 10. In this case, the second belt 26 is provided with a plurality of second adsorption holes (not shown).

[Third Belt Transportation Unit]

The third belt transportation unit 30 functions as an intermediate transportation unit that transfers, to the second belt transportation unit 20, the paper 1 received from the first belt transportation unit 10. The third belt transportation unit 30 transports the paper 1 in the transportation direction (direction Y) with the recording surface thereof facing the direction Z. The third belt transportation unit 30 comprises a third upstream side pulley 32, a third downstream side pulley 34, a drive pulley 35, and a third belt 36.

The third upstream side pulley 32 has a rotary shaft (not shown) that extends in a horizontal direction and the rotary shaft is pivotally supported such that the rotary shaft can rotate. The third downstream side pulley 34 has a rotary shaft (not shown) that is parallel to the rotary shaft of the third upstream side pulley 32 and the rotary shaft is pivotally supported such that the rotary shaft can rotate. The drive pulley 35 (example of driving pulley) has a rotary shaft (not shown) that is parallel to the rotary shaft of the third upstream side pulley 32 and the rotary shaft is pivotally supported such that the rotary shaft can rotate.

A third distance between the rotary shaft of the third upstream side pulley 32 and the rotary shaft of the third downstream side pulley 34 is preferably shorter than the first distance between the rotary shaft of the first upstream side pulley 12 and the rotary shaft of the first downstream side pulley 14 and the second distance between the rotary shaft of the second upstream side pulley 22 and the rotary shaft of the second downstream side pulley 24. Here, the third distance is 500 mm.

The third belt 36 is an endless belt formed of rubber (example of resin). The third belt 36 is looped over the third upstream side pulley 32, the third downstream side pulley 34, and the drive pulley 35.

Since the third belt 36 is formed of rubber, pulleys having relatively small diameters can be used as the third upstream side pulley 32 and the third downstream side pulley 34. Here, the third upstream side pulley 32 and the third downstream side pulley 34 are equal to each other in diameter. In addition, the diameter of the third upstream side pulley 32 is smaller than the diameter of the first downstream side pulley 14 and the diameter of the third downstream side pulley 34 is smaller than the diameter of the second upstream side pulley 22. Furthermore, the diameter of the drive pulley 35 is larger than the diameters of the third upstream side pulley 32 and the third downstream side pulley 34. By securing a relatively large diameter for the drive pulley 35, it is possible to cause the third belt to travel appropriately.

The drive pulley 35 has a motor 35M (example of third drive unit) as driving means. In a case where the motor 35M is driven, the drive pulley 35 rotates counterclockwise in FIG. 1. The third upstream side pulley 32 and the third downstream side pulley 34 rotate counterclockwise in FIG. 1 following the rotation of the drive pulley 35. In a case where the third upstream side pulley 32, the third downstream side pulley 34, and the drive pulley 35 rotate, the third belt 36 travels along a traveling route between the third upstream side pulley 32 and the third downstream side pulley 34.

On a transportation surface of the third belt 36, the paper 1 transferred from the first belt transportation unit 10 is placed. The third belt transportation unit 30 transports the paper 1 placed on the third belt 36 along a transportation route (example of third transportation route) from the third upstream side pulley 32 to the third downstream side pulley 34 and transfers the paper 1 to the second belt transportation unit 20. In the transportation route from an upper end of the third upstream side pulley 32 to an upper end of the third downstream side pulley 34, the transportation surface of the third belt 36 forms a flat plane.

The transportation surface of the first belt 16 in the transportation route of the first belt transportation unit 10, the transportation surface of the third belt 36 in the transportation route of the third belt transportation unit 30, and the transportation surface of the second belt 26 in the transportation route of the second belt transportation unit 20 form the same plane.

Here, the motor 14M of the first belt transportation unit 10, the motor 35M of the third belt transportation unit 30, and the motor 24M of the second belt transportation unit 20 are driven in synchronization with each other. Accordingly, the motor 14M, the motor 35M, and the motor 24M respectively cause the first belt 16, the third belt 36, and the second belt 26 to travel at the same speed.

Note that, the motor 14M, the motor 35M, and the motor 24M may be a common motor. In this case, it is possible to make the traveling speeds of the first belt 16, the third belt 36, and the second belt 26 the same as each other by performing transmission with speed reduction made in accordance with the diameters of the first downstream side pulley 14, the drive pulley 35, and the second downstream side pulley 24.

An embodiment in which the motor 14M and the motor 24M are driven as a common motor in synchronization with the motor 35M, an embodiment in which the motor 14M and the motor 35M are driven as a common motor in synchronization with the motor 24M, and an embodiment in which the motor 24M and the motor 35M are driven as a common motor in synchronization with the motor 14M are also possible.

An interval between the first belt transportation unit 10 and the third belt transportation unit 30 and an interval between the third belt transportation unit 30 and the second belt transportation unit 20 are preferably as short as possible to such a degree that no interference occurs. It is preferable that a distance at a position where the first belt 16 and the third belt 36 become closest to each other and a distance at a position where the third belt 36 and the second belt 26 become closest to each other are preferably 1 to 30 mm and more preferably 5 to 15 mm. Here, both of the distances are 10 mm.

[Arrangement of Transportation Units and Pulley Diameters]

Figure 2:
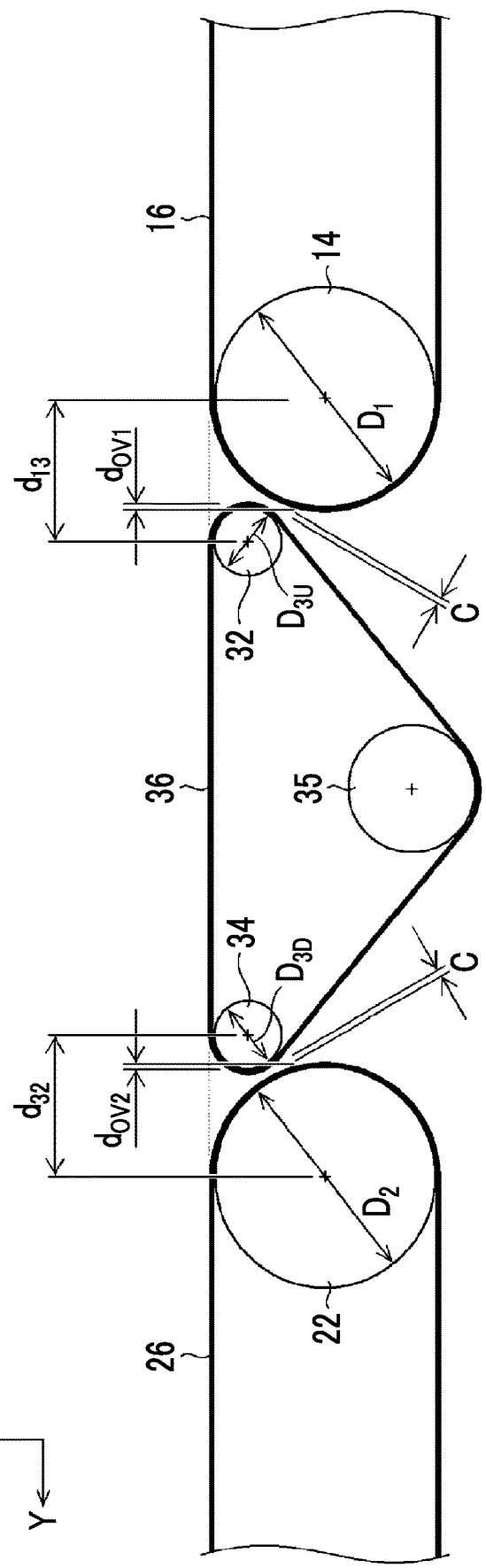
FIG. 2 is a schematic view showing the arrangement of each transportation unit.

FIG. 2 is a schematic view showing the arrangement of the first belt transportation unit 10, the third belt transportation unit 30, and the second belt transportation unit 20.

As shown in FIG. 2, the first belt transportation unit 10 and the third belt transportation unit 30 are disposed such that a distance at a position where the first belt 16 and the third belt 36 become closest to each other becomes c. The distance c is preferably 1 to 30 mm and more preferably 5 to 15 mm. Here, the distance c is 10 mm.

In addition, in a case where the diameter of the first downstream side pulley 14 is $D_1$ and the diameter of the third upstream side pulley 32 is $D_{3U}$, as described above, $D_1 > D_{3U}$ (Expression 1) is satisfied. Furthermore, it is preferable that $D_1/D_{3U} \geq 2$ (Expression 2) is satisfied.

That is, the diameter $D_1$ of a pulley that is disposed on a lowermost stream side in the transportation route of a belt transportation unit that performs transfer between belt transportation units for transfer and the diameter $D_{3U}$ of a pulley that is disposed on an uppermost stream side in the transportation route of a belt transportation unit that performs reception preferably satisfy Expression 1 and more preferably satisfy Expression 2.

As described above, since the diameters of the first downstream side pulley 14 and the third upstream side pulley 32 satisfy at least Expression 1, a distance $d_{13}$ between the transportation route of the first belt transportation unit 10 and the transportation route of the third belt transportation unit 30 can be made relatively small and thus the paper 1 can be transported stably.

Furthermore, the first belt transportation unit 10 and the third belt transportation unit 30 are disposed such that the first downstream side pulley 14 and the third upstream side pulley 32 partially overlap each other as seen in the direction Z (example of plan view of third belt in third transportation route). In an example shown in FIG. 2, the amount of overlap is $d_{OV1}$.

As described above, since the first downstream side pulley 14 and the third upstream side pulley 32 partially overlap each other, the distance $d_{13}$ can be made smaller and thus the paper 1 can be transported stably.

Similarly, the third belt transportation unit 30 and the second belt transportation unit 20 are disposed such that a distance at a position where the third belt 36 and the second belt 26 become closest to each other becomes c. The distance c is preferably 1 to 30 mm and more preferably 5 to 15 mm. Here, the distance c is 10 mm.

In addition, in a case where the diameter of the second upstream side pulley 22 is $D_2$ and the diameter of the third downstream side pulley 34 is $D_{3D}$, as described above, $D_2 > D_{3D}$ (Expression 3) is satisfied. Furthermore, it is preferable that $D_2/D_{3d} \geq 2$ (Expression 4) is satisfied.

That is, the diameter $D_{3D}$ of a pulley that is disposed on a lowermost stream side in the transportation route of a belt transportation unit that performs transfer between belt transportation units for transfer and the diameter $D_2$ of a pulley that is disposed on an uppermost stream side in the transportation route of a belt transportation unit that performs reception preferably satisfy Expression 3 and more preferably satisfy Expression 4.

Accordingly, a distance d32 between the transportation route of the third belt transportation unit 30 and the transportation route of the second belt transportation unit 20 can be made relatively small and thus the paper 1 can be transported stably.

Furthermore, the third belt transportation unit 30 and the second belt transportation unit 20 are disposed such that the third downstream side pulley 34 and the second upstream side pulley 22 partially overlap each other as seen in the direction Z by $d_{OV2}$.

Accordingly, the distance d32 can be made smaller and thus the paper 1 can be transported stably.

In an example shown in FIG. 2, the configuration satisfies Expression 2 and Expression 4. However, a configuration that satisfies only one of Expression 2 and Expression 4 may also be adopted.

[Pretreatment Liquid Applying Unit]

Referring again to FIG. 1, the pretreatment liquid applying unit 70 is provided at a position facing the transportation surface of the first belt 16 of the first belt transportation unit 10.

The pretreatment liquid applying unit 70 comprises a treatment liquid jetting head 72 and a treatment liquid drying unit 74.

The treatment liquid jetting head 72 jets out pretreatment liquid to the paper 1 placed on the first belt 16 such that the pretreatment liquid is applied to the recording surface of the paper 1. The pretreatment liquid applied here is an acidic liquid having an effect of aggregating coloring materials contained in ink used in the image forming unit 80.

The treatment liquid drying unit 74 dries the pretreatment liquid applied to the recording surface of the paper 1. The treatment liquid drying unit 74 comprises a warm air heater (not shown). The warm air heater comprises, for example, a heat source such as a halogen heater or an infrared heater and a fan or a blower that blows a gas heated by means of the heat source. Examples of the gas heated by means of the heat source include air. Another gas may be used instead of air or in addition to air.

[Image Forming Unit]

The image forming unit 80 is provided at a position that faces the transportation surface of the first belt 16 and is downstream of the pretreatment liquid applying unit 70 in the transportation direction of the paper 1.

The image forming unit 80 comprises ink jet heads 82C, 82M, 82Y, 82K, 82LC, 82LM, and 82CL, and a camera 84.

The ink jet heads 82C, 82M, 82Y, 82K, 82LC, 82LM, and 82CL are disposed at regular intervals along the transportation route of the paper 1. The ink jet heads 82C, 82M, 82Y, 82K, 82LC, 82LM, and 82CL are line heads that can form an image on one paper 1 in one passage. A line head is a head in which a plurality of nozzles (not shown) jetting out liquid droplets are disposed over a length equal to or greater than a width in a direction orthogonal to the transportation direction of the paper 1. A line head may be configured by connecting a plurality of head modules (not shown) to each other.

The ink jet heads 82C, 82M, 82Y, 82K, 82LC, 82LM, and 82CL form a color image on the paper 1 by respectively jetting out droplets of aqueous cyan ink, magenta ink, yellow ink, black ink, light cyan ink, and light magenta ink and clear ink on the paper 1 transported by the first belt transportation unit 10.

The camera 84 images an image formed on the recording surface of the paper 1. Data of the image imaged by the camera 84 is used for jetting failure inspection of the nozzles (not shown) of the ink jet heads 82C, 82M, 82Y, 82K, 82LC, 82LM, and 82CL.

As described above, with respect to the paper 1 transported by the first belt transportation unit 10, the applying of pretreatment liquid, the drying of the pretreatment liquid, the forming of an image, and the imaging of the image are performed.

[Ink Drying Unit]

The ink drying unit 90 is provided at a position facing the transportation surface of the second belt 26 of the second belt transportation unit 20.

The ink drying unit 90 heats the paper 1 after image formation to dry ink. The ink drying unit 90 comprises an ink dryer unit 92. The ink dryer unit 92 is configured by disposing a plurality of rod-shaped heaters (not shown) at regular intervals along the transportation route of the paper 1, for example. Each heater is disposed to be orthogonal to the transportation direction of the paper 1. As a heater, for example, at least one of a halogen heater or an infrared heater is used. In addition, the ink dryer unit 92 may include blowing means such as a fan or a blower.

As described above, a drying process is performed on the paper 1 transported by the second belt transportation unit 20.

[Paper Feeding Unit and Paper Discharge Unit]

The paper feeding unit 60 is disposed upstream of the first belt transportation unit 10 in the transportation direction of the paper 1. The paper feeding unit 60 transfers the paper 1 to the first belt transportation unit 10 in an one-by-one manner.

The paper discharge unit 62 is disposed downstream of the second belt transportation unit 20 in the transportation direction of the paper 1. The paper discharge unit 62 receives the paper 1 transferred from the second belt transportation unit 20, stacks the paper 1, and collects the paper 1.

According to the ink jet printing apparatus 100 configured as described above, the paper 1 can be transported from the paper feeding unit 60 to the paper discharge unit 62. In addition, during the transportation, pretreatment liquid application, image formation, and drying can be performed with respect to the paper 1. Since the third belt transportation unit 30 of which the pulleys are relatively small in diameter is provided between the first belt transportation unit 10 where pretreatment liquid application and image formation are performed and the second belt transportation unit 20 where drying is performed, the paper 1 can be appropriately transferred from the first belt transportation unit 10 to the second belt transportation unit 20 via the third belt transportation unit 30.

Second Embodiment

Figure 3:
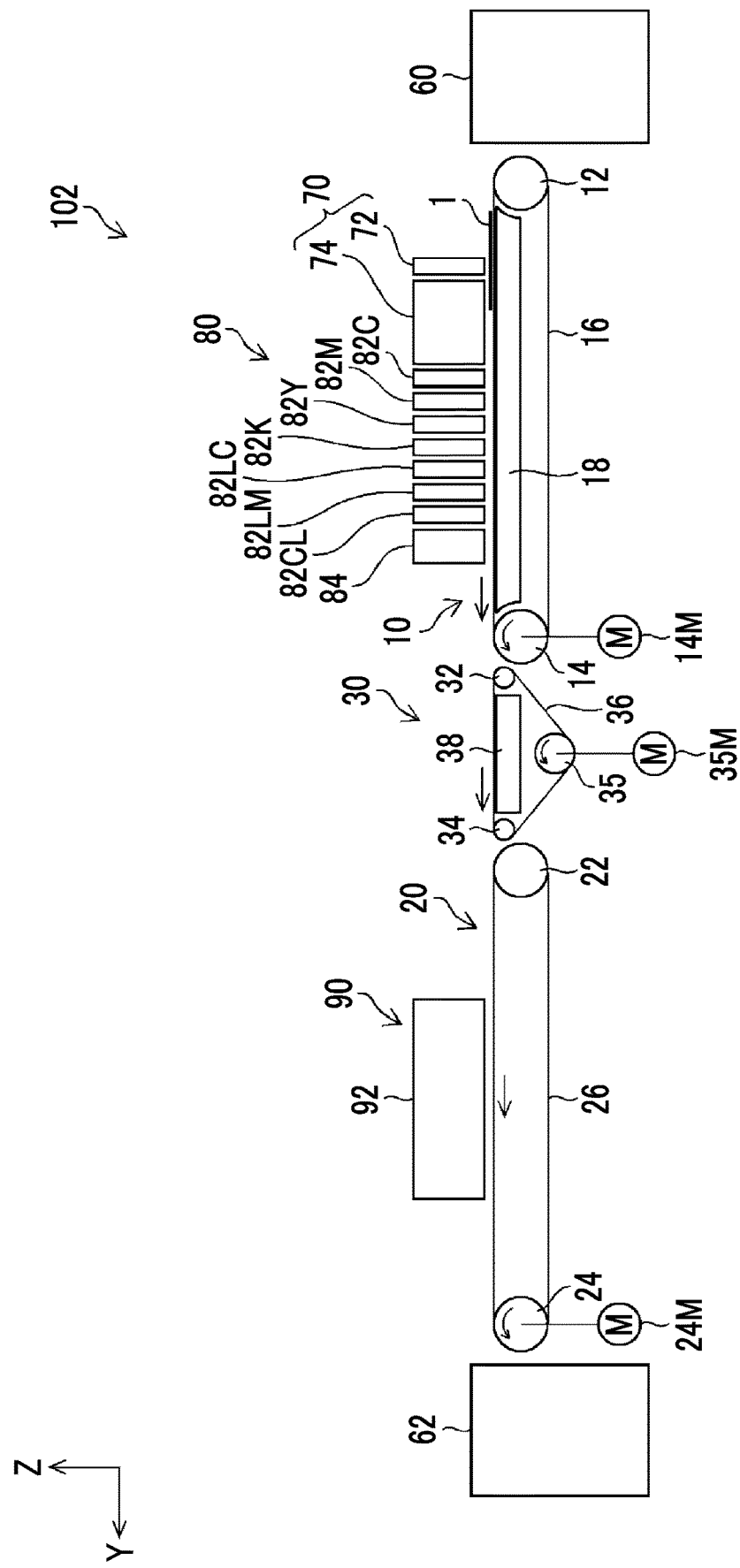
FIG. 3 is an entire configuration view of an ink jet printing apparatus.

FIG. 3 is an entire configuration view of an ink jet printing apparatus 102 according to a second embodiment. The same reference numerals are given to the same parts as those in the entire configuration view shown in FIG. 1 and the detailed description thereof will be omitted.

The third belt transportation unit 30 of the ink jet printing apparatus 102 comprises an adsorption unit 38.

The adsorption unit 38 comprises a chamber (not shown) (example of third negative pressure generating unit) that supports the third belt 36 by means of a flat surface from a side opposite to the transportation surface and an exhaust pump (not shown) that discharges air from the inside of the chamber.

The third belt 36 is provided with a plurality of third adsorption holes (not shown). The adsorption unit 38 sucks the third adsorption holes of the third belt 36 with the exhaust pump discharging air from the inside of the chamber such that the paper 1 placed on the transportation surface of the third belt 36 is adsorbed and held at the transportation surface.

According to the ink jet printing apparatus 102 configured as described above, since the paper 1 is adsorbed and transported in the third belt transportation unit 30, it is possible to prevent the paper 1 from rising and to transport the paper 1 appropriately.

Third Embodiment

Figure 4:
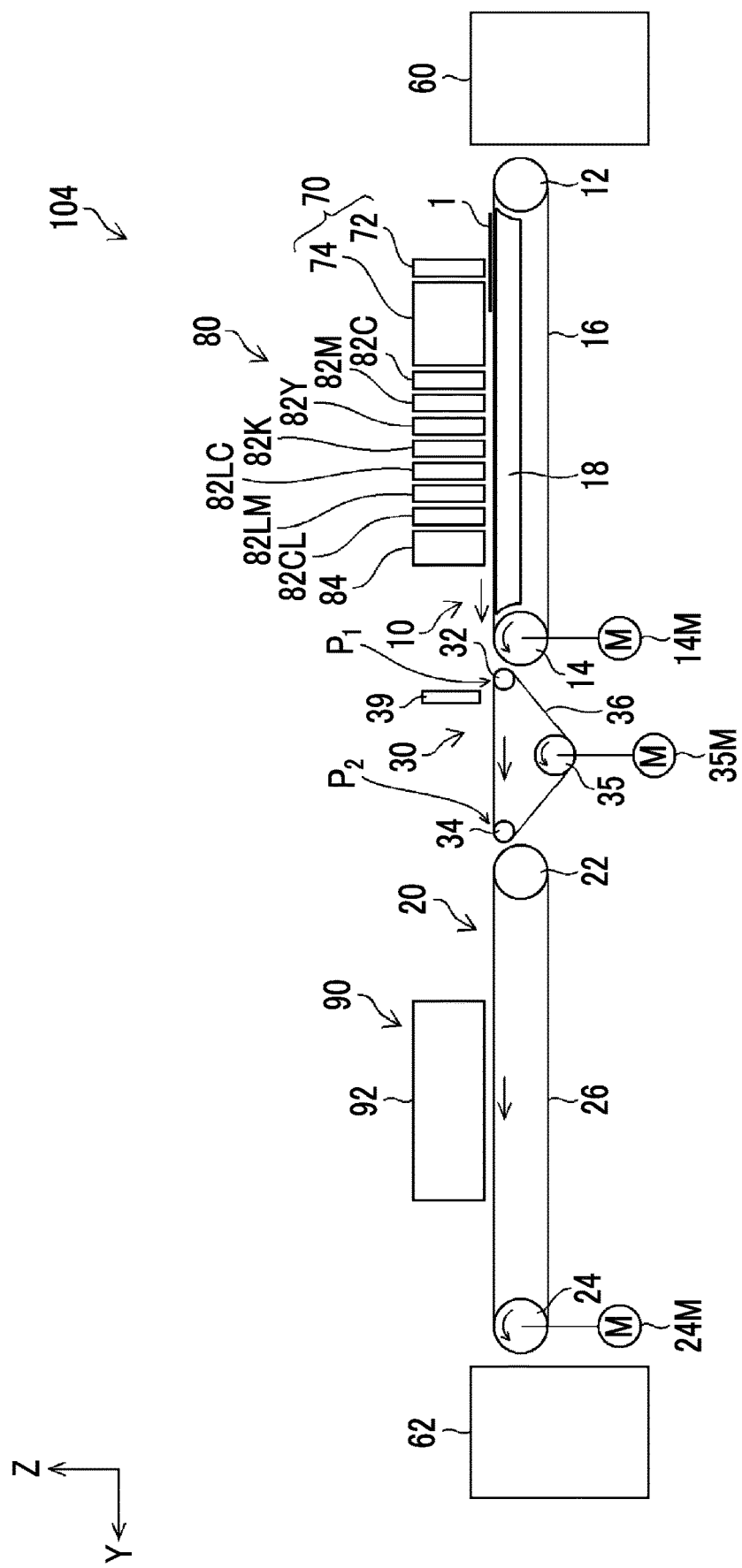
FIG. 4 is an entire configuration view of an ink jet printing apparatus.

FIG. 4 is an entire configuration view of an ink jet printing apparatus 104 according to a third embodiment. The same reference numerals are given to the same parts as those in the entire configuration view shown in FIG. 1 and the detailed description thereof will be omitted.

The third belt transportation unit 30 of the ink jet printing apparatus 104 comprises a rise preventing blower unit 39 (example of first blower unit). The rise preventing blower unit 39 comprises a fan or a blower that blows a gas in a direction perpendicular to (recording surface of paper 1 transported by) the transportation surface of the third belt 36. Examples of the gas blown include air. Another gas may be used instead of air or in addition to air. The rise preventing blower unit 39 blows a gas toward the vicinity of a start point $P_1$ (example of start point of third transportation route) of the transportation route of the third belt transportation unit 30 such that the paper 1 passing through the transportation route is prevented from rising.

Note that, the rise preventing blower unit 39 may blow a gas toward the vicinity of an end point $P_2$ (example of end point of third transportation route) of the transportation route of the third belt transportation unit 30 and may blow a gas toward the vicinity of both of the start point $P_1$ and the end point $P_2$ of the transportation route of the third belt transportation unit 30.

According to the ink jet printing apparatus 104 configured as described above, the paper 1 can be pressed against the third belt 36 by means of air blown from the rise preventing blower unit 39 and thus it is possible to prevent the paper 1 from rising and to transport the paper 1 appropriately.

Fourth Embodiment

Figure 5:
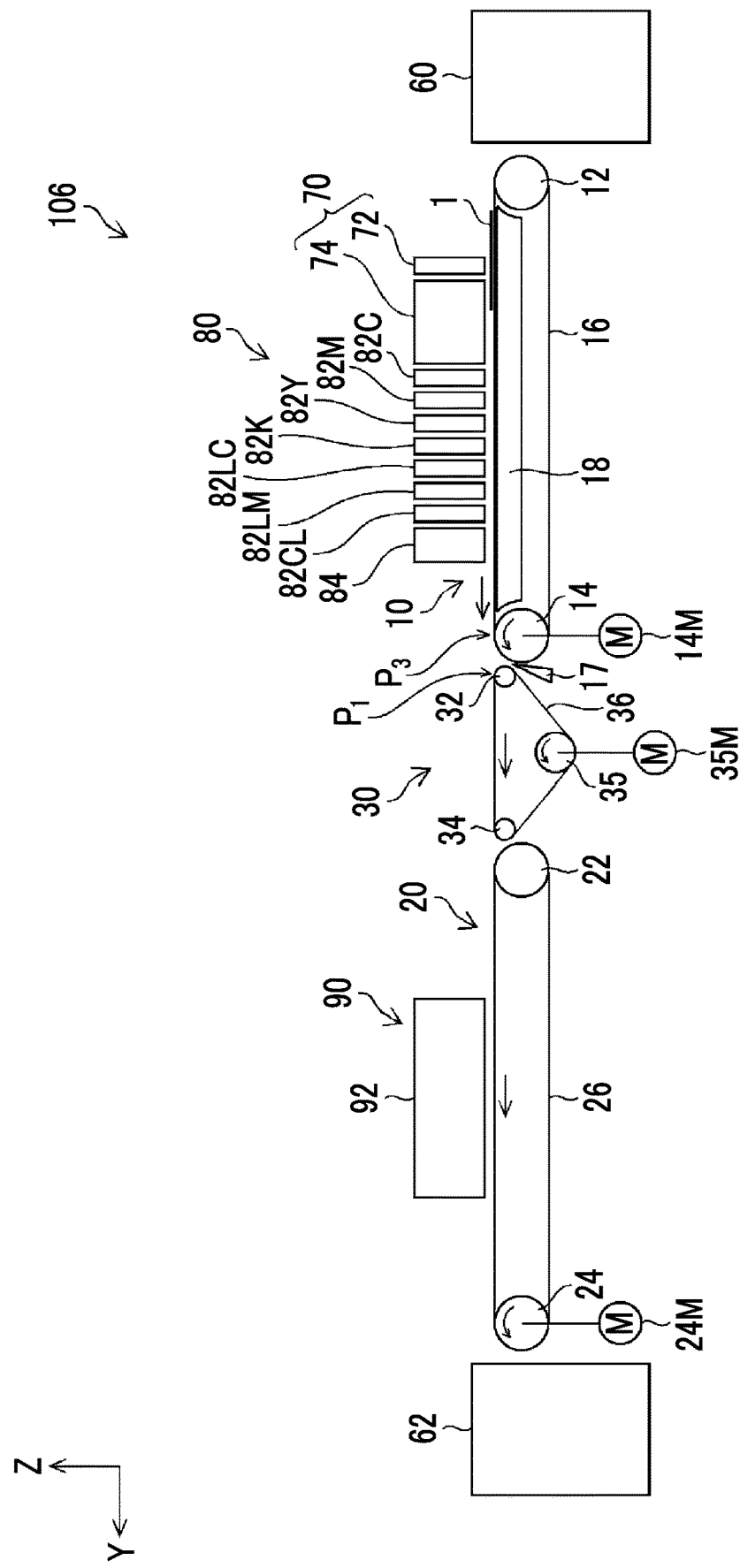
FIG. 5 is an entire configuration view of an ink jet printing apparatus.

FIG. 5 is an entire configuration view of an ink jet printing apparatus 106 according to a fourth embodiment. The same reference numerals are given to the same parts as those in the entire configuration view shown in FIG. 1 and the detailed description thereof will be omitted.

The first belt transportation unit 10 of the ink jet printing apparatus 106 comprises a peeling mechanism for the paper 1. Here, a peeling plate-shaped member 17 is comprised as the peeling mechanism.

The peeling plate-shaped member 17 has a width in a width direction orthogonal to a traveling direction of the first belt 16. The peeling plate-shaped member 17 is disposed such that a tip end thereof abuts onto the first belt 16 at a position between an end point $P_3$ of the transportation route of the first belt transportation unit 10 and the start point $P_1$ of the transportation route of the third belt transportation unit 30. The peeling plate-shaped member 17 enters a space between the paper 1 placed on the transportation surface of the first belt 16 and the transportation surface of the first belt 16 to peel off the paper 1 from the first belt 16. The paper 1 peeled off from the first belt 16 by the peeling plate-shaped member 17 is transferred to the third belt transportation unit 30.

According to the ink jet printing apparatus 106 configured as described above, since the paper 1 is peeled off from the first belt 16 at the first belt transportation unit 10, the paper 1 can be appropriately transferred to the third belt transportation unit 30.

Fifth Embodiment

Figure 6:
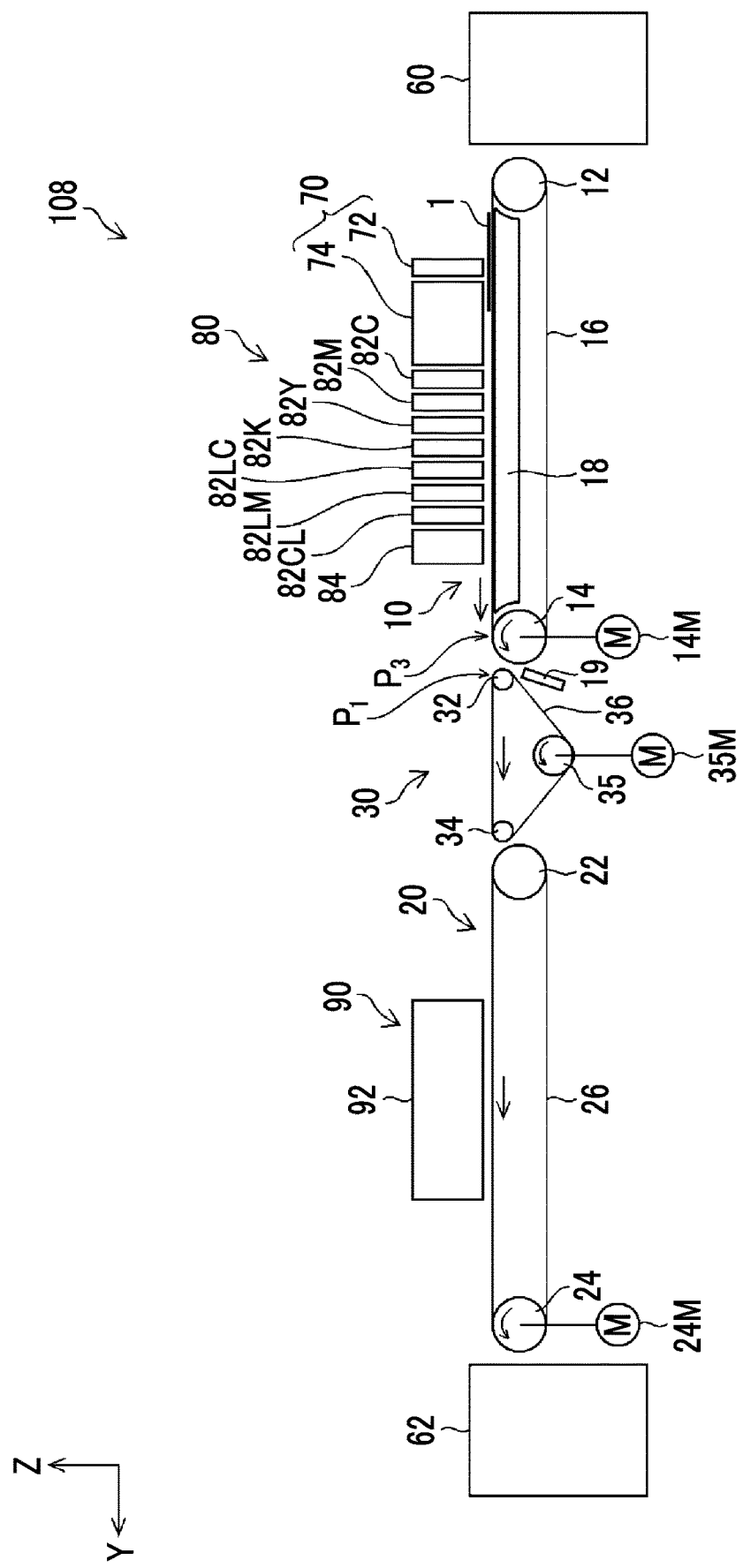
FIG. 6 is an entire configuration view of an ink jet printing apparatus.

FIG. 6 is an entire configuration view of an ink jet printing apparatus 108 according to a fifth embodiment. The same reference numerals are given to the same parts as those in the entire configuration view shown in FIG. 1 and the detailed description thereof will be omitted.

The first belt transportation unit 10 of the ink jet printing apparatus 108 comprises a peeling blower unit 19 as a peeling mechanism.

The peeling blower unit 19 (example of second blower unit) comprises a fan or a blower that blows a gas. The peeling blower unit 19 blows a gas in a direction along a tangent line to the first downstream side pulley 14 and a direction opposite to the traveling direction of the first belt 16 at a position between the end point $P_3$ of the transportation route of the first belt transportation unit 10 and the start point $P_1$ of the transportation route of the third belt transportation unit 30 such that the gas is blown to a space between the first belt 16 and a leading end of the paper 1. Here, the leading end of the paper 1 is an end portion of the paper 1 and is an end portion positioned on an upstream side in the transportation direction.

The peeling blower unit 19 causes a gas to enter a space between the paper 1 placed on the transportation surface of the first belt 16 and the transportation surface of the first belt 16 to peel off the paper 1 from the first belt 16. The paper 1 peeled off from the first belt 16 by the peeling blower unit 19 is transferred to the third belt transportation unit 30.

According to the ink jet printing apparatus 108 configured as described above, since the paper 1 is peeled off from the first belt 16 at the first belt transportation unit 10, the paper 1 can be appropriately transferred to the third belt transportation unit 30.

Note that, the first downstream side pulley 14 may be provided with a hole (not shown) and the peeling blower unit 19 may be a mechanism (example of third blower unit) that blows a gas to the outside of the first downstream side pulley 14 from the inside thereof via the hole. The gas blown out from the first downstream side pulley 14 is discharged via a plurality of adsorption holes (not shown) of the first belt 16 and peels off the paper 1 from the first belt 16.

In the case of the ink jet printing apparatuses 100, 102, 104, 106, and 108, the first belt transportation unit 10 is provided with the pretreatment liquid applying unit 70 and the image forming unit 80 and the second belt transportation unit 20 is provided with the ink drying unit 90. However, those may not be provided and the belt transportation units can also be used as simple transportation devices. In addition, a processing unit to be provided for each belt transportation unit can be appropriately selected.

For example, modification examples such as an embodiment in which the first belt transportation unit 10 is provided with a corona treatment unit that performs a reforming process of a recording surface of paper and the second belt transportation unit 20 is provided with an image forming unit, an embodiment in which the first belt transportation unit 10 is provided with a corona treatment unit and a pretreatment liquid applying unit and the second belt transportation unit 20 is provided with an image forming unit, an embodiment in which the first belt transportation unit 10 is provided with a pretreatment liquid applying unit and the second belt transportation unit 20 is provided with an image forming unit, an embodiment in which the first belt transportation unit 10 is provided with a pretreatment liquid applying unit or an image forming unit and the second belt transportation unit 20 is provided with an ink drying unit, an embodiment in which the first belt transportation unit 10 is provided with an image forming unit and the second belt transportation unit 20 is provided with a second image forming unit comprising additional colors, special colors, and special ink or the like that the image forming unit does not have, an embodiment in which an image forming unit is provided upstream of the first belt transportation unit 10, the first belt transportation unit 10 is provided with an ink drying unit, and the second belt transportation unit 20 is provided with a post treatment liquid applying unit for aqueous varnish or ultraviolet curing varnish, and an embodiment in which an image forming unit is provided downstream of the second belt transportation unit 20 are conceivable.

In any case, it is preferable that the third belt transportation unit 30 is provided with no processing unit. Since the third belt transportation unit 30 is an intermediate transportation unit that performs transfer between the first belt transportation unit 10 and the second belt transportation unit 20, the transportation route thereof is relatively short. In addition, here, a belt formed of rubber is used as the third belt 36 and thus the durability thereof is inferior to a metal belt and the flatness of the paper 1 placed thereon is also inferior. Therefore, it is not appropriate to perform processing on the paper 1 thereon.

Sixth Embodiment

Figure 7:
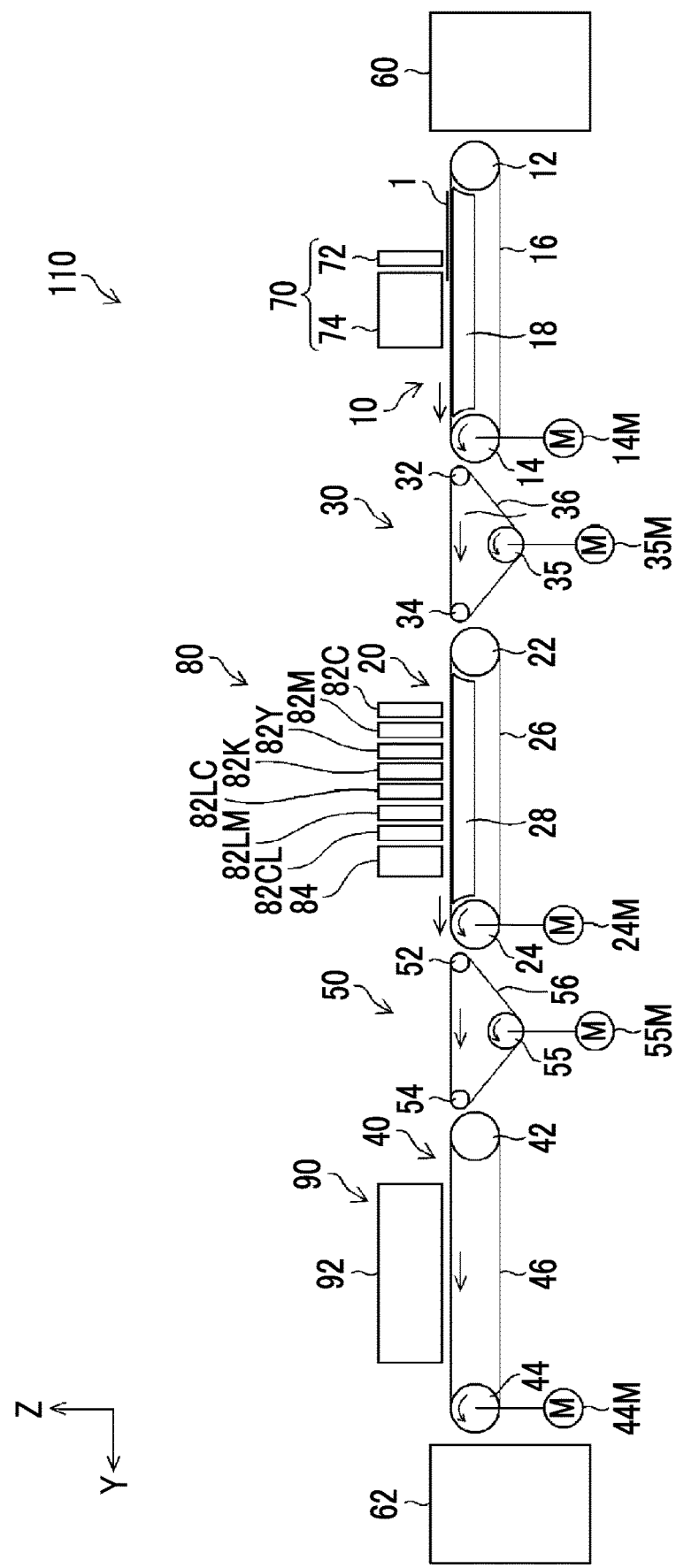
FIG. 7 is an entire configuration view of an ink jet printing apparatus.

FIG. 7 is an entire configuration view of an ink jet printing apparatus 110 according to a sixth embodiment. The same reference numerals are given to the same parts as those in the entire configuration view shown in FIG. 1 and the detailed description thereof will be omitted. As shown in FIG. 7, the ink jet printing apparatus 110 comprises a fourth belt transportation unit 40 and a fifth belt transportation unit 50 in addition to the first belt transportation unit 10, the second belt transportation unit 20, the third belt transportation unit 30, the pretreatment liquid applying unit 70, the image forming unit 80, and the ink drying unit 90.

[Second Belt Transportation Unit]

The second belt transportation unit 20 comprises an adsorption unit 28. The adsorption unit 28 comprises a chamber (not shown) that supports the second belt 26 by means of a flat surface from a side opposite to the transportation surface and an exhaust pump (not shown) that discharges air from the inside of the chamber. In addition, the second belt 26 is provided with a plurality of adsorption holes (not shown). The adsorption unit 28 sucks the adsorption holes of the second belt 26 with the exhaust pump discharging air from the inside of the chamber such that the paper 1 placed on the transportation surface of the second belt 26 is adsorbed and held at the transportation surface. The adsorption unit 28 is disposed such that the paper 1 can be adsorbed and held over an area from a position that is to the right of a left end of the second upstream side pulley 22 to a position that is to the left of a right end of the second downstream side pulley 24 in FIG. 7.

[Fourth Belt Transportation Unit]

The fourth belt transportation unit 40 transports the paper 1 in the transportation direction (direction Y) with the recording surface thereof facing the direction Z. The fourth belt transportation unit 40 comprises a fourth upstream side pulley 42, a fourth downstream side pulley 44, and a fourth belt 46.

The fourth upstream side pulley 42 has a rotary shaft (not shown) that extends in a horizontal direction and the rotary shaft is pivotally supported such that the rotary shaft can rotate. The fourth downstream side pulley 44 has a rotary shaft (not shown) that is parallel to the rotary shaft of the fourth upstream side pulley 42 and the rotary shaft is pivotally supported such that the rotary shaft can rotate. Here, a distance between the rotary shaft of the fourth upstream side pulley 42 and the rotary shaft of the fourth downstream side pulley 44 is 3 m.

The fourth belt 46 is an endless belt formed of stainless steel. The fourth belt 46 is looped over the fourth upstream side pulley 42 and the fourth downstream side pulley 44. Since the fourth belt 46 formed of stainless steel is used, it is possible to maintain the flatness of the paper 1 favorably. Note that, since the fourth belt 46 is formed of stainless steel, pulleys having relatively large diameters are used as the fourth upstream side pulley 42 and the fourth downstream side pulley 44. Here, the fourth upstream side pulley 42 and the fourth downstream side pulley 44 are equal to each other in diameter.

The fourth downstream side pulley 44 has a motor 44M as driving means. In a case where the motor 44M is driven, the fourth downstream side pulley 44 rotates counterclockwise in FIG. 7. The fourth upstream side pulley 42 rotates counterclockwise in FIG. 7 following the rotation of the fourth downstream side pulley 44. In a case where the fourth upstream side pulley 42 and the fourth downstream side pulley 44 rotate, the fourth belt 46 travels along a traveling route between the fourth upstream side pulley 42 and the fourth downstream side pulley 44.

On a transportation surface of the fourth belt 46, the paper 1 transferred from the fifth belt transportation unit 50 is placed. The fourth belt transportation unit 40 transports the paper 1 placed on the fourth belt 46 along a transportation route from the fourth upstream side pulley 42 to the fourth downstream side pulley 44 and discharges the paper 1 to the paper discharge unit 62. In the transportation route from an upper end of the fourth upstream side pulley 42 to an upper end of the fourth downstream side pulley 44, the transportation surface of the fourth belt 46 forms a flat plane.

Note that, the fourth belt transportation unit 40 may be provided with an adsorption unit such that the paper 1 is adsorbed at the transportation surface of the fourth belt 46. The adsorption unit may have the same configuration as the adsorption unit 18 of the first belt transportation unit 10. In this case, the fourth belt 46 is provided with a plurality of adsorption holes (not shown).

[Fifth Belt Transportation Unit]

The fifth belt transportation unit 50 transports the paper 1 in the transportation direction (direction Y) with the recording surface thereof facing the direction Z. The fifth belt transportation unit 50 comprises a fifth upstream side pulley 52, a fifth downstream side pulley 54, a drive pulley 55, and a fifth belt 56.

The fifth upstream side pulley 52 has a rotary shaft (not shown) that extends in a horizontal direction and the rotary shaft is pivotally supported such that the rotary shaft can rotate. The fifth downstream side pulley 54 has a rotary shaft (not shown) that is parallel to the rotary shaft of the fifth upstream side pulley 52 and the rotary shaft is pivotally supported such that the rotary shaft can rotate. The drive pulley 55 has a rotary shaft (not shown) that is parallel to the rotary shaft of the fifth upstream side pulley 52 and the rotary shaft is pivotally supported such that the rotary shaft can rotate. Here, a distance between the rotary shaft of the fifth upstream side pulley 52 and the rotary shaft of the fifth downstream side pulley 54 is 500 mm.

The fifth belt 56 is an endless belt formed of rubber. The fifth belt 56 is looped over the fifth upstream side pulley 52, the fifth downstream side pulley 54, and the drive pulley 55.

Since the fifth belt 56 is formed of rubber, pulleys having relatively small diameters can be used as the fifth upstream side pulley 52 and the fifth downstream side pulley 54. Here, the fifth upstream side pulley 52 and the fifth downstream side pulley 54 are equal to each other in diameter. In addition, the diameter of the fifth upstream side pulley 52 is smaller than the diameter of the second downstream side pulley 24 and the diameter of the fifth downstream side pulley 54 is smaller than the diameter of the fourth upstream side pulley 42. Furthermore, the diameter of the drive pulley 55 is larger than the diameters of the fifth upstream side pulley 52 and the fifth downstream side pulley 54.

The drive pulley 55 has a motor 55M as driving means. In a case where the motor 55M is driven, the drive pulley 55 rotates counterclockwise in FIG. 7. The fifth upstream side pulley 52 and the fifth downstream side pulley 54 rotate counterclockwise in FIG. 7 following the rotation of the drive pulley 55. In a case where the fifth upstream side pulley 52, the fifth downstream side pulley 54, and the drive pulley 55 rotate, the fifth belt 56 travels along a traveling route between the fifth upstream side pulley 52 and the fifth downstream side pulley 54.

On a transportation surface of the fifth belt 56, the paper 1 transferred from the second belt transportation unit 20 is placed. The fifth belt transportation unit 50 transports the paper 1 placed on the fifth belt 56 along a transportation route from the fifth upstream side pulley 52 to the fifth downstream side pulley 54 and transfers the paper 1 to the fourth belt transportation unit 40. In the transportation route from an upper end of the fifth upstream side pulley 52 to an upper end of the fifth downstream side pulley 54, the transportation surface of the fifth belt 56 forms a flat plane.

Note that, the fifth belt transportation unit 50 may be provided with an adsorption unit such that the paper 1 is adsorbed at the transportation surface of the fifth belt 56. The adsorption unit may have the same configuration as the adsorption unit 38 (refer to FIG. 3) of the third belt transportation unit 30. In this case, the fifth belt 56 is provided with a plurality of adsorption holes (not shown).

In the ink jet printing apparatus 110, the transportation surface of the first belt 16 in the transportation route of the first belt transportation unit 10, the transportation surface of the third belt 36 in the transportation route of the third belt transportation unit 30, the transportation surface of the second belt 26 in the transportation route of the second belt transportation unit 20, the transportation surface of the fifth belt 56 in the transportation route of the fifth belt transportation unit 50, and the transportation surface of the fourth belt 46 in the transportation route of the fourth belt transportation unit 40 form the same plane.

Here, the motor 14M of the first belt transportation unit 10, the motor 35M of the third belt transportation unit 30, the motor 24M of the second belt transportation unit 20, the motor 55M of the fifth belt transportation unit 50, and the motor 44M of the fourth belt transportation unit 40 are driven in synchronization with each other and as a result, the traveling speeds of the first belt 16, the third belt 36, the second belt 26, the fifth belt 56, and the fourth belt 46 are made the same as each other.

Note that, the arrangement of the second belt transportation unit 20, the fifth belt transportation unit 50, and the fourth belt transportation unit 40 and the pulley diameters thereof are the same as the arrangement of the first belt transportation unit 10, the third belt transportation unit 30, and the second belt transportation unit 20 and the pulley diameters thereof which are described with use of FIG. 2.

<Evaluation of Paper Transportation>

In the ink jet printing apparatuses 100, 102, and 104, transportation of the paper 1 was evaluated while using the diameters of the pulleys as parameters. Here, whether transportation of the paper 1 in the second belt transportation unit 20 was favorable or not was evaluated with respect to the paper 1 fed from the paper feeding unit 60. Note that, the diameters of the first upstream side pulley 12 and the first downstream side pulley 14 were $D_1$, the diameters of the second upstream side pulley 22 and the second downstream side pulley 24 where $D_2$, and the diameters of the third upstream side pulley 32 and the third downstream side pulley 34 were $D_3$.

Figure 8:
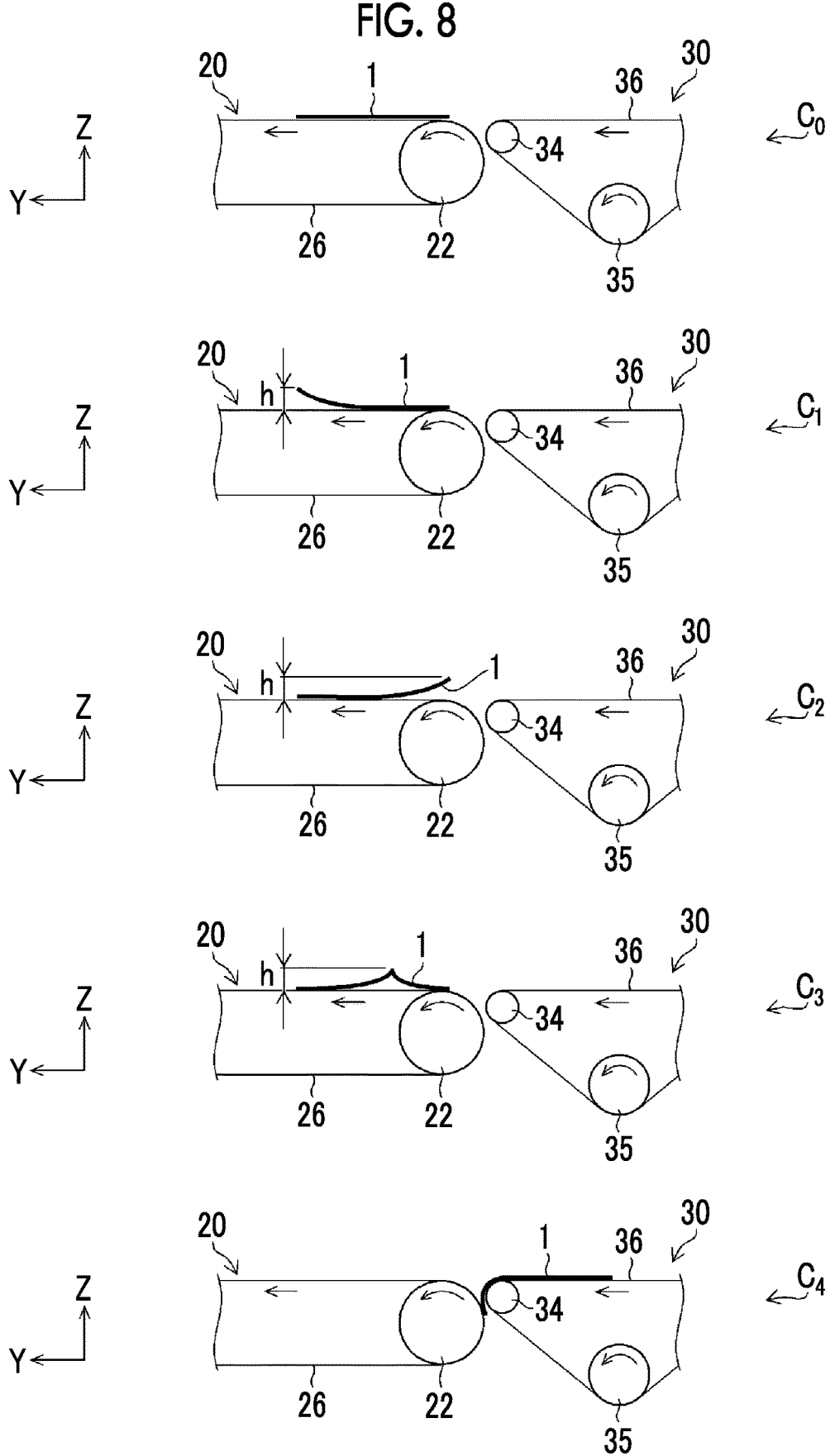
FIG. 8 is a view schematically illustrating paper being transported.

FIG. 8 is a view schematically illustrating the paper 1 being transported. Regarding the paper 1, there are a case where the paper 1 does not rise as in a case $C_0$ shown in FIG. 8, a case where a leading end of the paper 1 rises as in a case $C_1$, a case where a rear end of the paper 1 rises as in a case $C_2$, a case where an intermediate portion between the leading end and the rear end of the paper 1 rises as in a case $C_3$. As the amount of rise h for each case, the value of the position of the paper 1 where the height from the transportation surface of the second belt 26 in the direction Z became highest was measured.

In addition, there is a case where transfer to the second belt transportation unit 20 fails as in a case C4 shown in FIG. 8.

Here, as the paper 1, OK Top coat having a basis weight of 73 g/m² and a size of 200 mm in the direction Y, OK Top coat having a basis weight of 73 g/m² and a size of 100 mm in the direction Y, OK Top coat having a basis weight of 157 g/m² and a size of 200 mm in the direction Y, and OK Top coat having a basis weight of 157 g/m² and a size of 100 mm in the direction Y, which were produced by OJI PAPER Co., Ltd., were used.

In addition, in the image forming unit 80, an 100% coverage image (solid image) was formed on the paper 1 at a resolution of 1200×1200 dots per inch (dpi) by means of aqueous black ink.

The speed of transportation of the paper 1 in the first belt transportation unit 10, the third belt transportation unit 30, and the second belt transportation unit 20 was 700 mm/sec.

Classification on whether transportation was favorable or not was as follows.

A: There was no rise

B: The amount of rise was smaller than 0.5 mm (within allowable range)

C: The amount of rise was equal to or greater than 0.5 mm or transfer failed (not within allowable range)

Note that, the amount of rise of the paper 1 in the first belt transportation unit 10 was smaller than 0.5 mm in any case.

The results of evaluation are shown in Table 1.

TABLE 1

| | $D_1$ [mm] | $D_2$ [mm] | $D_3$ [mm] | Other Conditions | Paper Size [mm] | Basis Weight [g/m²] | Determination |
|---|---|---|---|---|---|---|---|
| Example 1 | 200 | 200 | 150 | | 200 | 157 | B |
| | | | | | 100 | 157 | C |
| | | | | | 200 | 73 | C |
| | | | | | 100 | 73 | C |
| Example 2 | 200 | 200 | 100 | | 200 | 157 | A |
| | | | | | 100 | 157 | B |
| | | | | | 200 | 73 | C |
| | | | | | 100 | 73 | C |
| Example 3 | 200 | 200 | 50 | | 200 | 157 | A |
| | | | | | 100 | 157 | A |
| | | | | | 200 | 73 | B |
| | | | | | 100 | 73 | C |
| Example 4 | 200 | 200 | 50 | Adsorption Was Performed | 200 | 157 | A |
| | | | | | 100 | 157 | A |
| | | | | | 200 | 73 | A |
| | | | | | 100 | 73 | A |
| Example 5 | 200 | 200 | 50 | Air Was Blown | 200 | 157 | A |
| | | | | | 100 | 157 | A |
| | | | | | 200 | 73 | A |
| | | | | | 100 | 73 | B |
| Example 6 | 200 | 150 | 100 | | 200 | 157 | A |
| | | | | | 100 | 157 | B |
| | | | | | 200 | 73 | C |
| | | | | | 100 | 73 | C |
| Example 7 | 150 | 200 | 100 | | 200 | 157 | A |
| | | | | | 100 | 157 | B |
| | | | | | 200 | 73 | C |
| | | | | | 100 | 73 | C |
| Comparative Example 1 | 200 | 200 | 200 | | 200 | 157 | C |
| | | | | | 100 | 157 | C |
| | | | | | 200 | 73 | C |
| | | | | | 100 | 73 | C |
| Comparative Example 2 | 200 | 200 | 200 | No Image Formation | 200 | 157 | B |
| | | | | | 100 | 157 | C |
| | | | | | 200 | 73 | C |
| | | | | | 100 | 73 | C |

In Examples 1 to 3, $D_1=D_2=200$ mm in the ink jet printing apparatus 100, $D_3$ in Example 1 was 150 mm, $D_3$ in Example 2 was 100 mm, or $D_3$ in Example 3 was 50 mm. Here, c=10 mm. As shown in Table 1, the smaller $D_3$ was, that is, the greater the values of $D_1/D_3$ and $D_2/D_3$ were, the more favorable the result of transportation was.

In Example 4, $D_1=D_2=200$ mm in the ink jet printing apparatus 102 and $D_3=50$ mm and Example 4 was different from Example 3 in a point that adsorption was performed by the adsorption unit 38 in the third belt transportation unit 30.

Here, in the third belt 36, the third adsorption holes each having a diameter of 100 μm were provided in a grid pattern at intervals of 10 mm. In addition, the third adsorption holes were sucked in the adsorption unit 38 such that the suction pressure in the third adsorption holes became 10 kPa.

The results of transportation in Example 4 were more favorable than those in Example 3. That is, it is considered that suction of the paper 1 performed by the adsorption unit 38 was effective.

In Example 5, $D_1=D_2=200$ mm and $D_3=50$ mm in the ink jet printing apparatus 104 and Example 5 was different from Example 3 in a point that a blowing operation was performed by the rise preventing blower unit 39 in the third belt transportation unit 30. The results of transportation in Example 5 were more favorable than those in Example 3. That is, it is considered that an operation of pressing the paper 1 against the third belt 36 performed by the rise preventing blower unit 39 was effective.

Examples 6 and 7 were cases where the pulley diameters of the first belt transportation unit 10 and the pulley diameters of the second belt transportation unit 20 were different from each other. In Example 6, $D_1=200$ mm, $D_2=150$ mm, and $D_3=100$ mm in the ink jet printing apparatus 100 and in Example 7, $D_1=150$ mm, $D_2=200$ mm, and $D_3=100$ mm. In Example 6 and Example 7, the results of transportation were the same as those in Example 2.

Meanwhile, Comparative Example 1 was a case where $D_1=D_2=D_3=200$ mm in the ink jet printing apparatus 100. In addition, Comparative Example 2 was a case where $D_1=D_2=D_3=200$ mm in the ink jet printing apparatus 100 and image formation was not performed in the image forming unit 80. As shown in Table 1, Comparative Example 1 and Comparative Example 2 were not preferable in evaluation results.

In addition, it can be understood from the results of Comparative Example 1 and Comparative Example 2 that a case where image formation is performed is under severer conditions than a case where no image formation is performed. Therefore, it is considered that the evaluation results of A and B in Examples 1 to 7 obtained in a case where image formation is performed in the image forming unit 80 are also naturally achieved in a case where no image formation is performed.

<Others>

Although a case where the diameters of the first upstream side pulley 12 and the first downstream side pulley 14 of the first belt transportation unit 10 are the same as each other has been described, the diameters may be different from each other. Similarly, the diameters of the second upstream side pulley 22 and the second downstream side pulley 24 of the second belt transportation unit 20 may be different from each other. Furthermore, the diameters of the third upstream side pulley 32 and the third downstream side pulley 34 of the third belt transportation unit 30 may be different from each other.

In addition, although a case where the transportation surface of the third belt 36 in the transportation route of the third belt transportation unit 30 is a horizontal surface has been described, the transportation surface is not limited to a horizontal surface and may be an inclined surface inclined with respect to a horizontal surface. The inclined surface may be an inclined surface that ascends toward a downstream side from an upstream side in the transportation route, may be an inclined surface that descends, and may be an inclined surface that is inclined with respect to a direction perpendicular to the transportation direction.

In addition, although an example where a sheet of paper 1 is used as a recording medium has been described, the present invention can be applied to a sheet-shaped recording medium formed of metal, resin, or the like. In addition, the present invention can be applied to any transportation medium instead of a recording medium.

The technical scope of the present invention is not limited to the scope described in the above-described embodiments. The configurations and the like in the respective embodiments can be combined as appropriate among the embodiments in a range not deviating from the gist of the present invention.

EXPLANATION OF REFERENCES

1: paper
10: first belt transportation unit
12: first upstream side pulley
14: first downstream side pulley
14M: motor
16: first belt
17: peeling plate-shaped member
18: adsorption unit
19: peeling blower unit
20: second belt transportation unit
22: second upstream side pulley
24: second downstream side pulley
24M: motor
26: second belt
28: adsorption unit
30: third belt transportation unit
32: third upstream side pulley
34: third downstream side pulley
35: drive pulley
35M: motor
36: third belt
38: adsorption unit
39: rise preventing blower unit
40: fourth belt transportation unit
42: fourth upstream side pulley
44: fourth downstream side pulley
44M: motor
46: fourth belt
50: fifth belt transportation unit
52: fifth upstream side pulley
54: fifth downstream side pulley
55: drive pulley
55M: motor
56: fifth belt
60: paper feeding unit
62: paper discharge unit
70: pretreatment liquid applying unit
72: treatment liquid jetting head
74: treatment liquid drying unit
80: image forming unit
82C: ink jet head
82CL: ink jet head
82K: ink jet head
82LC: ink jet head
82LM: ink jet head
82M: ink jet head
82Y: ink jet head
84: camera
90: ink drying unit
92: ink dryer unit
100: ink jet printing apparatus
102: ink jet printing apparatus
104: ink jet printing apparatus
106: ink jet printing apparatus
108: ink jet printing apparatus
110: ink jet printing apparatus
$C_0$: case
$C_1$: case
$C_2$: case
$C_3$: case
$C_4$: case
$P_1$: start point
$P_2$: end point
$P_3$: end point

What is claimed is:

1. An image forming apparatus comprising:
a first belt transportation unit that transports a recording medium;
a second belt transportation unit that transports the recording medium;
a third belt transportation unit that transports the recording medium received from the first belt transportation unit to transfer the recording medium to the second belt transportation unit; and
an image forming unit that forms an image on a recording surface of the recording medium,
wherein the first belt transportation unit has a first upstream side pulley, a first downstream side pulley, a first belt that is looped over the first upstream side pulley and the first downstream side pulley, and a first drive unit that causes the first belt to travel and the first belt transportation unit transports the recording medium along a first transportation route from the first upstream side pulley to the first downstream side pulley with the recording medium abutting onto the first belt,
wherein the second belt transportation unit has a second upstream side pulley, a second downstream side pulley, a second belt that is looped over the second upstream side pulley and the second downstream side pulley, and a second drive unit that causes the second belt to travel and the second belt transportation unit transports the recording medium along a second transportation route from the second upstream side pulley to the second downstream side pulley with the recording medium abutting onto the second belt,
wherein the third belt transportation unit has a third upstream side pulley, a third downstream side pulley, a third belt that is looped over the third upstream side pulley and the third downstream side pulley, and a third drive unit that causes the third belt to travel and the third belt transportation unit transports the recording medium along a third transportation route from the third upstream side pulley to the third downstream side pulley with the recording medium abutting onto the third belt, and
wherein a diameter of the third upstream side pulley is smaller than a diameter of the first downstream side pulley and a diameter of the third downstream side pulley is smaller than a diameter of the second upstream side pulley.

2. The image forming apparatus according to claim 1, wherein, in a case where the diameter of the first downstream side pulley is $D_1$, the diameter of the second upstream side pulley is $D_2$, the diameter of the third upstream side pulley is $D_{3U}$, and the diameter of the third downstream side pulley is $D_{3D}$, at least one of $D_1/D_{3U} \geq 2$ or $D_2/D_{3D} \geq 2$ is satisfied.

3. The image forming apparatus according to claim 1, wherein at least one of the first belt, the second belt, or the third belt is formed of metal.

4. The image forming apparatus according to claim 1, wherein the third belt is formed of resin.

5. The image forming apparatus according to claim 1, wherein the first belt and the second belt are formed of metal.

6. The image forming apparatus according to claim 1, wherein the first belt is provided with a plurality of first adsorption holes, and
wherein the first belt transportation unit comprises a first negative pressure generating unit that generates a negative pressure in the plurality of first adsorption holes.

7. The image forming apparatus according to claim 1, wherein the second belt is provided with a plurality of second adsorption holes, and
wherein the second belt transportation unit comprises a second negative pressure generating unit that generates a negative pressure in the plurality of second adsorption holes.

8. The image forming apparatus according to claim 1, wherein the third belt is provided with a plurality of third adsorption holes, and
wherein the third belt transportation unit comprises a third negative pressure generating unit that generates a negative pressure in the plurality of third adsorption holes.

9. The image forming apparatus according to claim 1, wherein the third belt transportation unit comprises a first blower unit that blows a gas toward the recording surface of the recording medium in the third transportation route.

10. The image forming apparatus according to claim 1, wherein the first belt transportation unit comprises a peeling mechanism that peels off the recording medium from the first belt.

11. The image forming apparatus according to claim 10, wherein the peeling mechanism comprises a plate-shaped member abutting onto the recording medium.

12. The image forming apparatus according to claim 10, wherein the peeling mechanism comprises a second blower unit that blows a gas to a space between the first belt and a leading end of the recording medium.

13. The image forming apparatus according to claim 10, wherein the peeling mechanism comprises a third blower unit that blows a gas to an outside of the first downstream side pulley from an inside of the first downstream side pulley.

14. The image forming apparatus according to claim 1, wherein the first drive unit, the second drive unit, and the third drive unit respectively cause the first belt, the second belt, and the third belt to travel in synchronization with each other.

15. The image forming apparatus according to claim 1, wherein the first drive unit, the second drive unit, and the third drive unit respectively cause the first belt, the second belt, and the third belt to travel at the same speed.

16. The image forming apparatus according to claim 1, wherein the third belt transportation unit comprises a driving pulley,
wherein the third belt is looped over the third upstream side pulley, the third downstream side pulley, and the driving pulley, and
wherein the third drive unit rotates the driving pulley.

17. The image forming apparatus according to claim 1, wherein the first belt in the first transportation route, the second belt in the second transportation route, and the third belt in the third transportation route are disposed on the same plane.

18. The image forming apparatus according to claim 17, wherein the first downstream side pulley and the third upstream side pulley are disposed to partially overlap each other as seen in plan view of the third belt in the third transportation route.

19. The image forming apparatus according to claim 17, wherein the third downstream side pulley and the second upstream side pulley are disposed to partially overlap each other as seen in plan view of the third belt in the third transportation route.

20. The image forming apparatus according to claim 1, wherein the image forming unit is disposed to face at least one of the first transportation route or the second transportation route.

* * * * *